United States Patent
Chun et al.

(10) Patent No.: US 8,244,987 B2
(45) Date of Patent: Aug. 14, 2012

(54) MEMORY ACCESS DEVICE INCLUDING MULTIPLE PROCESSORS

(75) Inventors: Ik Jae Chun, Daejeon (KR); Tae Moon Roh, Daejeon (KR); Jongdae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 349 days.

(21) Appl. No.: 12/629,721

(22) Filed: Dec. 2, 2009

(65) Prior Publication Data

US 2010/0146219 A1 Jun. 10, 2010

(30) Foreign Application Priority Data

Dec. 4, 2008 (KR) .................... 10-2008-122680
Apr. 13, 2009 (KR) .................... 10-2009-031776

(51) Int. Cl.
*G06F 12/00* (2006.01)
(52) U.S. Cl. ........ 711/150; 711/119; 711/147; 711/202; 711/221
(58) Field of Classification Search .................... None
See application file for complete search history.

(56) References Cited

U.S. PATENT DOCUMENTS

| | | | |
|---|---|---|---|
| 5,136,500 A | 8/1992 | Lemay et al. | |
| 6,304,502 B1 | 10/2001 | Watanabe et al. | |
| 7,080,215 B2 | 7/2006 | Ueno | |
| 7,475,210 B2 | 1/2009 | Yamada | |
| 2002/0120709 A1 | 8/2002 | Chow et al. | |
| 2005/0160237 A1* | 7/2005 | Tierney et al. | ................ 711/145 |

FOREIGN PATENT DOCUMENTS

| | | |
|---|---|---|
| JP | 05-233421 A | 9/1993 |
| JP | 06-175911 A | 6/1994 |
| JP | 2003-316753 A | 11/2003 |
| JP | 2006-227912 A | 8/2006 |
| JP | 2008-276391 A | 11/2008 |
| KR | 10-1992-0011122 | 6/1992 |
| KR | 10-2006-0127400 A | 12/2006 |
| KR | 10-2007-0085561 A | 8/2007 |
| KR | 10-2007-0107163 A | 11/2007 |

* cited by examiner

*Primary Examiner* — Shawn X Gu

(57) ABSTRACT

Provided is a memory access device including multiple processors accessing a specific memory. The memory access device includes first and second processors, first and second transaction controllers, a memory access switch, and a memory controller. The first and second transaction controllers are connected respectively to the first and second processors. The memory access switch is connected to the first and second transaction controllers. The memory controller is connected to the memory access switch to control a memory device. Herein, if the first and second processors simultaneously access the memory device, the second processor stores an address or data in the second transaction controller while the first processor is accessing the memory device.

15 Claims, 5 Drawing Sheets

MEMORY ACCESS DEVICE INCLUDING MULTIPLE PROCESSORS

CROSS-REFERENCE TO RELATED APPLICATIONS

This U.S. non-provisional patent application claims priority under 35 U.S.C. §119 of Korean Patent Application Nos. 10-2008-0122680, filed on Dec. 4, 2008, and 10-2009-0031776, filed on Apr. 13, 2009, the entire contents of which are hereby incorporated by reference.

BACKGROUND OF THE INVENTION

The present invention disclosed herein relates to memory access devices, and more particularly, to memory access devices including multiple processors accessing a specific memory.

An embedded system includes a processor and a memory device that stores data accessed by the processor. A dynamic random access memory (DRAM) device is used as the memory device of the embedded system. Typically, an embedded system uses a DRAM device as a system memory.

In an embedded system, a processor communicates with a system memory through a processor bus and a memory controller. The processor generates a memory access request. The memory access request includes a memory command (e.g., a read or write command) and an address that indicates a read location of data/commands or a write location of data/commands.

The memory controller generates not only row/column addresses but also suitable command signals. The memory controller applies address/command signals to the system memory through a system bus. The system memory transmits data, corresponding to the commands or addresses, to the processor through the system bus.

SUMMARY OF THE INVENTION

Embodiments of the present invention provide devices for efficiently managing multiple processors that simultaneously access a specific memory.

In some embodiments of the present invention, memory access devices include: first and second processors; first and second transaction controllers connected respectively to the first and second processors; a memory access switch connected to the first and second transaction controllers; and a memory controller connected to the memory access switch to control a memory device. Herein, if the first and second processors simultaneously access the memory device, the second processor may store an address or data in the second transaction controller while the first processor is accessing the memory device.

In some embodiments, the memory access switch includes a bandwidth control scheduler storing schedule information about the access of the memory device by the first and second processors, and the bandwidth control scheduler transmits the stored schedule information to the first and second transaction controllers.

In other embodiments, the stored schedule information is transmitted from an external device by a user.

In further embodiments, the memory access switch includes a bus matrix.

In still further embodiments, the first/second transaction controller includes: a data buffer storing the data temporarily; an address table storing an address corresponding to the data stored in the data buffer; an address comparator comparing the address stored in the address table and an address requested by the first/second processor and outputting the comparison result; and a stream controller receiving the comparison result from the address comparator and connecting the first/second processor and the memory access switch according to the received comparison result.

In still further embodiments, wherein if the address requested by the first/second processor is included in the address table, the stream controller outputs data, corresponding to the address, from the data buffer to the first/second processor.

In still further embodiments, wherein if the address requested by the first/second processor is not included in the address table, the stream controller outputs data, corresponding to the address, from the memory device to the first/second processor.

In still further embodiments, the first processor performs another operation while the second processor is accessing the memory device.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
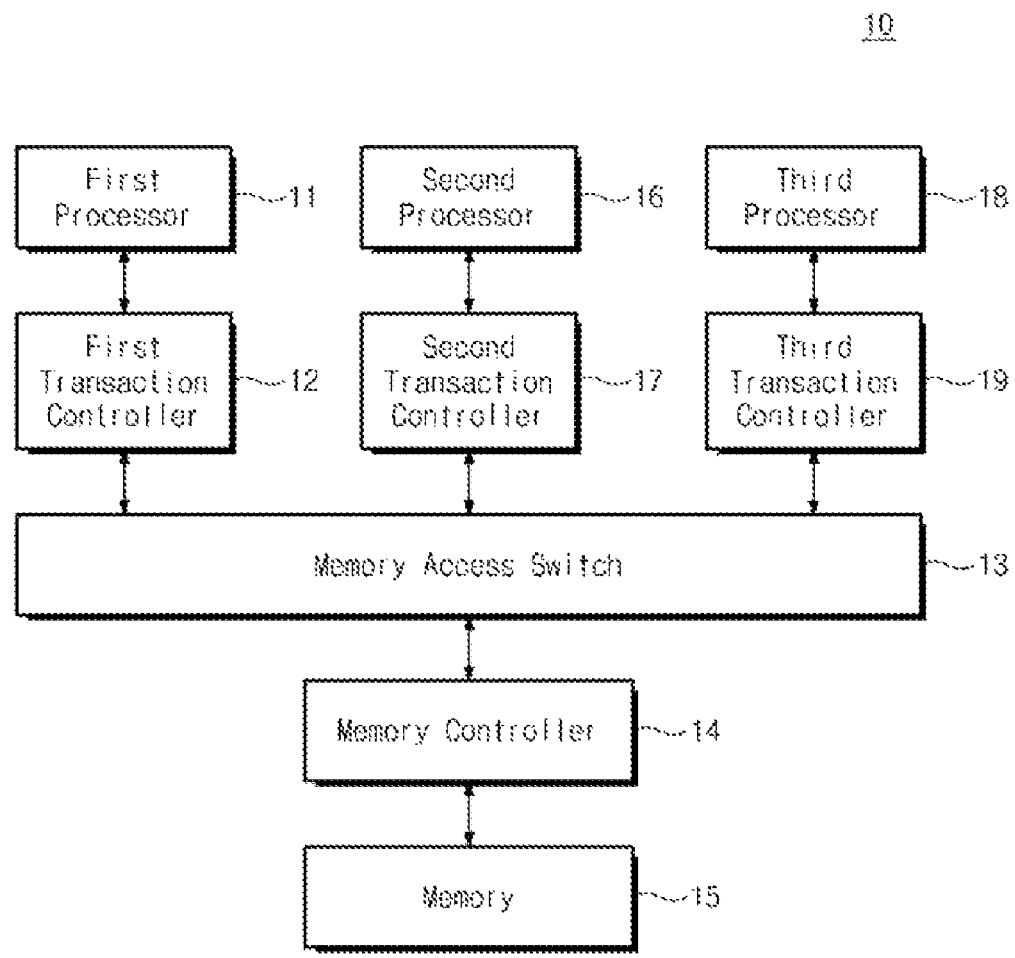
FIG. 1 is a block diagram of a memory access device according to an exemplary embodiment of the present invention.

FIG. 1 is a block diagram of a memory access device according to an exemplary embodiment of the present invention.

Referring to FIG. 1, a memory access device 10 according to an exemplary embodiment of the present invention includes a first processor 11, a first transaction controller 12, a memory access switch 13, a memory controller 14, a memory device 15, a second processor 16, a second transaction controller 17, a third processor 18, and a third transaction controller 19.

The first processor 11 is connected through the first transaction controller 12 to the memory access switch 13. The first transaction controller 12 temporarily stores an access address of the first processor 11 and data corresponding to the access address. That is, the first transaction controller 12 serves as a buffer or cache memory of the first processor 11. The first transaction controller 12 will be described later in detail with reference to FIG. 2.

The memory access switch 13 operates as a system bus to transmit addresses and data. Also, the memory access switch 13 may operate as a bus matrix such as an Advanced eXtended Interface (AXI) interconnect of AMBA3(ARM™). The AXI interconnect has a bus matrix structure with a plurality of channels. The AXI interconnect may simultaneously connect a plurality of bus masters and a plurality of bus slaves by using a plurality of multiplexers and a plurality of demultiplexers. A plurality of bus masters may simultaneously access different bus slaves by using an AXI interconnect.

The memory access switch 13 interconnects the first to third transaction controllers 12, 17 and 19 and the memory controller 14. The memory access switch 13 will be described later in detail with reference to FIG. 2.

The memory controller 14 performs a control operation to read/store data from/in the memory device 15. The first processor 11 accesses the memory device 15 through the memory controller 14 connected to the memory access switch 13. The memory controller 14 transmits data, stored in the memory device 15, through the memory access switch 13 to the first processor 11.

The second processor 16 is connected through the second transaction controller 17 to the memory access switch 13. The second transaction controller 17 temporarily stores an access address of the second processor 16 and data corresponding to the access address.

The third processor 18 is connected through the third transaction controller 19 to the memory access switch 13. The third transaction controller 19 temporarily stores an access address of the third processor 18 and data corresponding to the access address. The second and third transaction controllers 17 and 19 have the same configuration as the first transaction controller 12. The operations of the first to third transaction controllers 12, 17 and 19 will be described later in detail with reference to FIG. 4.

Figure 2:
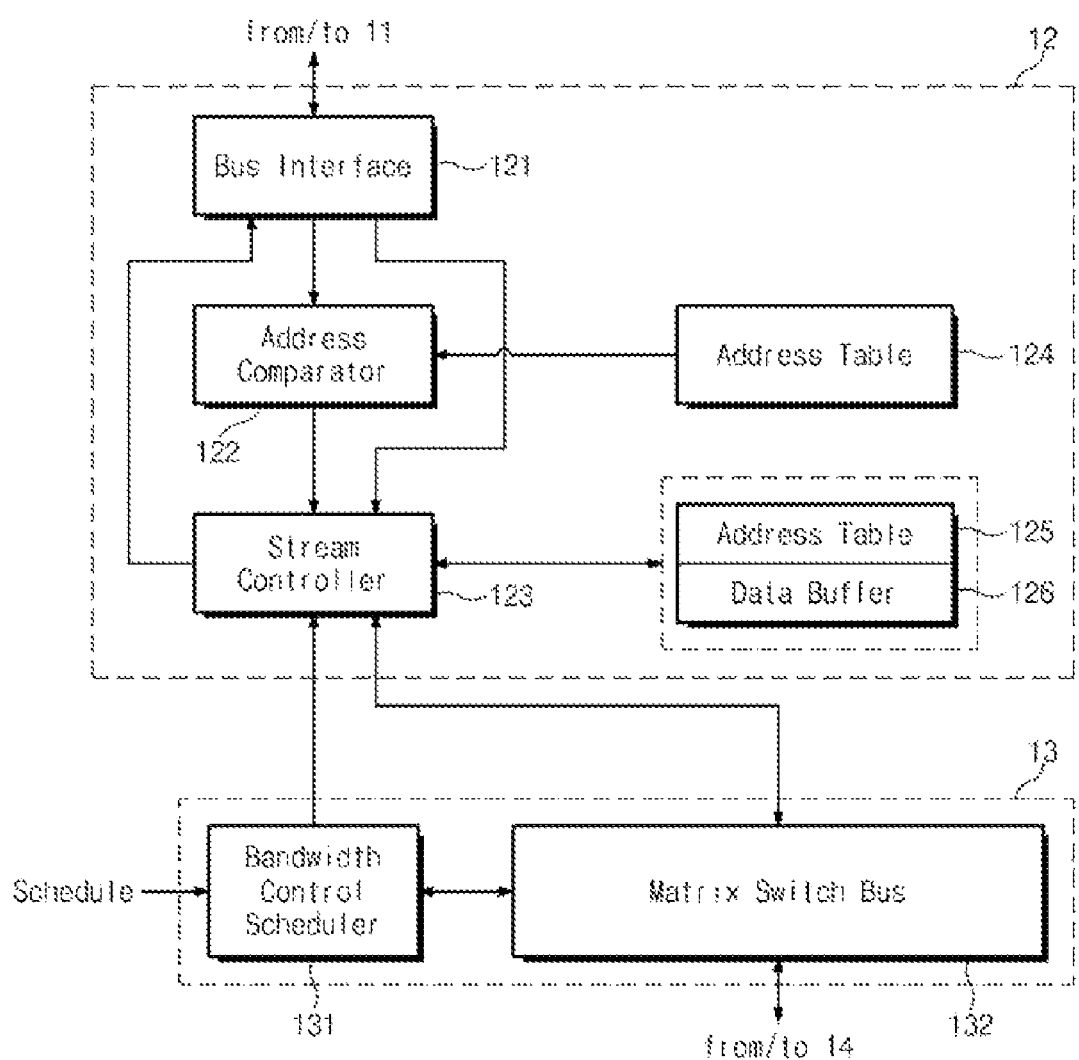
FIG. 2 is a block diagram of a first transaction controller and a memory access switch illustrated in FIG. 1.

FIG. 2 is a block diagram of the first transaction controller 12 and the memory access switch 13 illustrated in FIG. 1.

Referring to FIGS. 1 and 2, the memory access switch 13 according to an exemplary embodiment includes a bandwidth control scheduler 131 and a matrix switch bus 132.

According to an exemplary embodiment, the bandwidth control scheduler 131 receives program information from the outside of the memory access device 10 by a user. The program information includes schedule information about the access of the memory device 15 by the first to third processors 11, 16 and 18. The user compiles an execution program of the first to third processor 11, 16 and 18 to extract schedule information of the first to third processors 11, 16 and 18. The extracted schedule information is inputted as program information into the bandwidth control scheduler 131.

The matrix switch bus 132 enables a plurality of master blocks to simultaneously access a plurality of slave blocks.

According to an exemplary embodiment, the first transaction controller 12 includes a bus interface 121, an address comparator 122, a stream controller 123, an address table 124, an address buffer 125, and a data buffer 126.

The bus interface 121 interfaces between the first processor 11 and the matrix switch bus 132. The address comparator 122 compares an address stored in the address table 124 and an address requested by the first processor 11, and transmits the comparison result to the stream controller 123.

The stream controller 123 receives schedule information about the access of the memory device 15 by the first processor 11 from the bandwidth control scheduler 131. Thus, the stream controller 123 may pre-allocate the access time of the first process 11 to the memory device 15 according to the received schedule information. Also, the stream controller 123 connects the first processor 11 to the matrix switch bus 132. The address table 124 stores address information, which was temporarily stored in the address buffer 125, and provides the stored address to the address comparator 122.

The address buffer 125 temporarily stores addresses corresponding to data to be read from the memory device 15. The data buffer 126 temporarily stores data to be stored in the memory device 15.

For example, if the first processor 11 requests an address from the memory controller 14, the address comparator 122 compares the address requested by the first processor 11 and the address stored in the address table 124 and transmits the comparison result to the stream controller 123.

If the address requested by the first processor 11 is present in the address table 124 (i.e., HIT), the stream controller 123 reads data, corresponding to the address, from the data buffer 126 and transmits the data to the first processor 11.

If the address requested by the first processor 11 is not present in the address table 124 (i.e., MISS), the stream controller 123 transmits the address to the memory controller 14. The memory controller 14 transmits data, corresponding to the address, through the memory access switch 13 to the first processor 11.

The second and third transaction controllers have the same configuration as the first transaction controller illustrated in FIG. 2. The operations of the first to third transaction controllers will be described later in detail with reference to FIG. 4.

Figure 3:
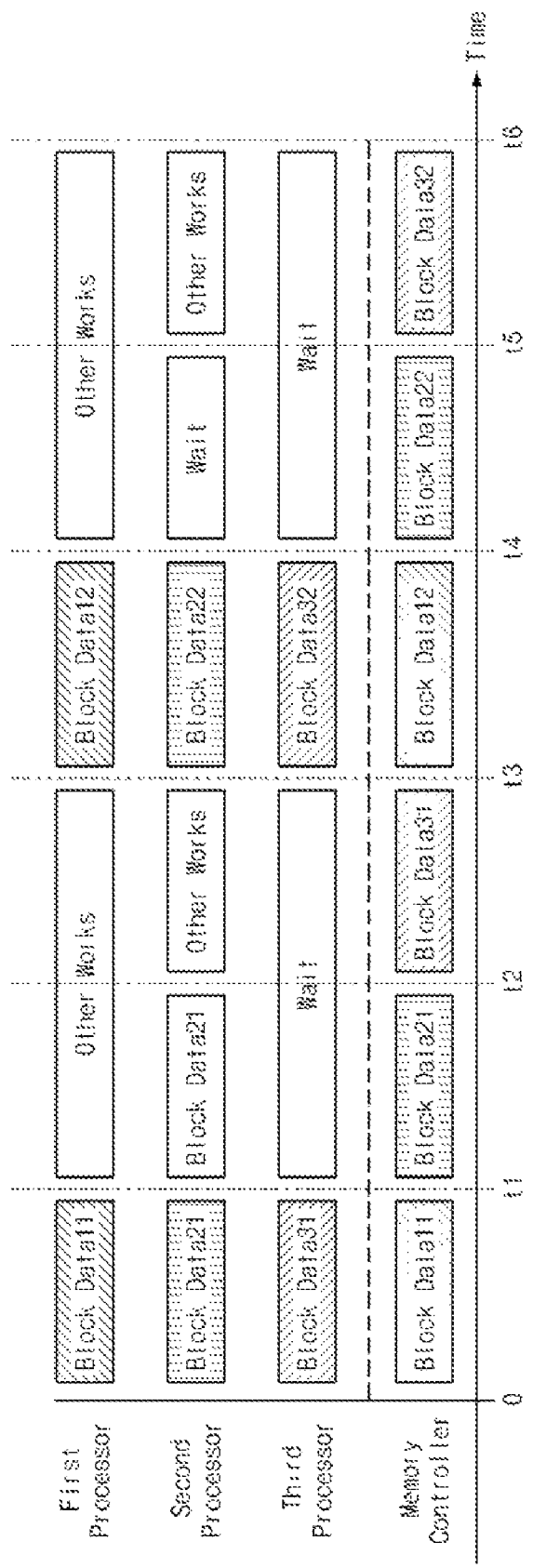
FIG. 3 is a timing diagram of an operation according to an exemplary embodiment of the present invention.

FIG. 3 is a timing diagram of an operation according to an exemplary embodiment of the present invention.

The timing diagram of FIG. 3 is based on the assumption that the first to third processors are connected directly to the memory access switch without being connected to the first to third transaction controllers. Otherwise, the timing diagram of FIG. 3 is based on the assumption that the first to third transaction controllers connected to the first to third processors are bypassed and do not operate.

Referring to FIGS. 1 to 3, it is assumed that the first to third processors 11, 16 and 18 simultaneously access the memory device 15.

In a time period from 0 to t1, the first processor 11 stores data Block Data 11 in the memory device 15 through the memory access switch 13. At this point, the second and third processors 16 and 18 maintain a standby state to access the memory device 15.

In a time period from t1 to t2, the second processor 16 stores data Block Data21 in the memory device 15 through the memory access switch 13. At this point, the third processor 18 maintains a standby state to access the memory device 15, and the first processor 11 performs another operation.

In a time period from t2 to t3, the third processor 18 stores data Block Data31 in the memory device 15 through the memory access switch 13. At this point, the first and second processors 11 and 16 perform other operations.

In a time period from t3 to t4, the first processor 11 stores data Block Data 12 in the memory device 15 through the memory access switch 13. At this point, the second and third processors 16 and 18 maintain a standby state to access the memory device 15.

In a time period from t4 to t5, the second processor 16 stores data Block Data22 in the memory device 15 through the memory access switch 13. At this point, the third processor 18 maintains a standby state to access the memory device 15, and the first processor 11 performs another operation.

In a time period from t5 to t6, the third processor 18 stores data Block Data32 in the memory device 15 through the memory access switch 13. At this point, the first and second processors 11 and 16 perform other operations.

Figure 4:
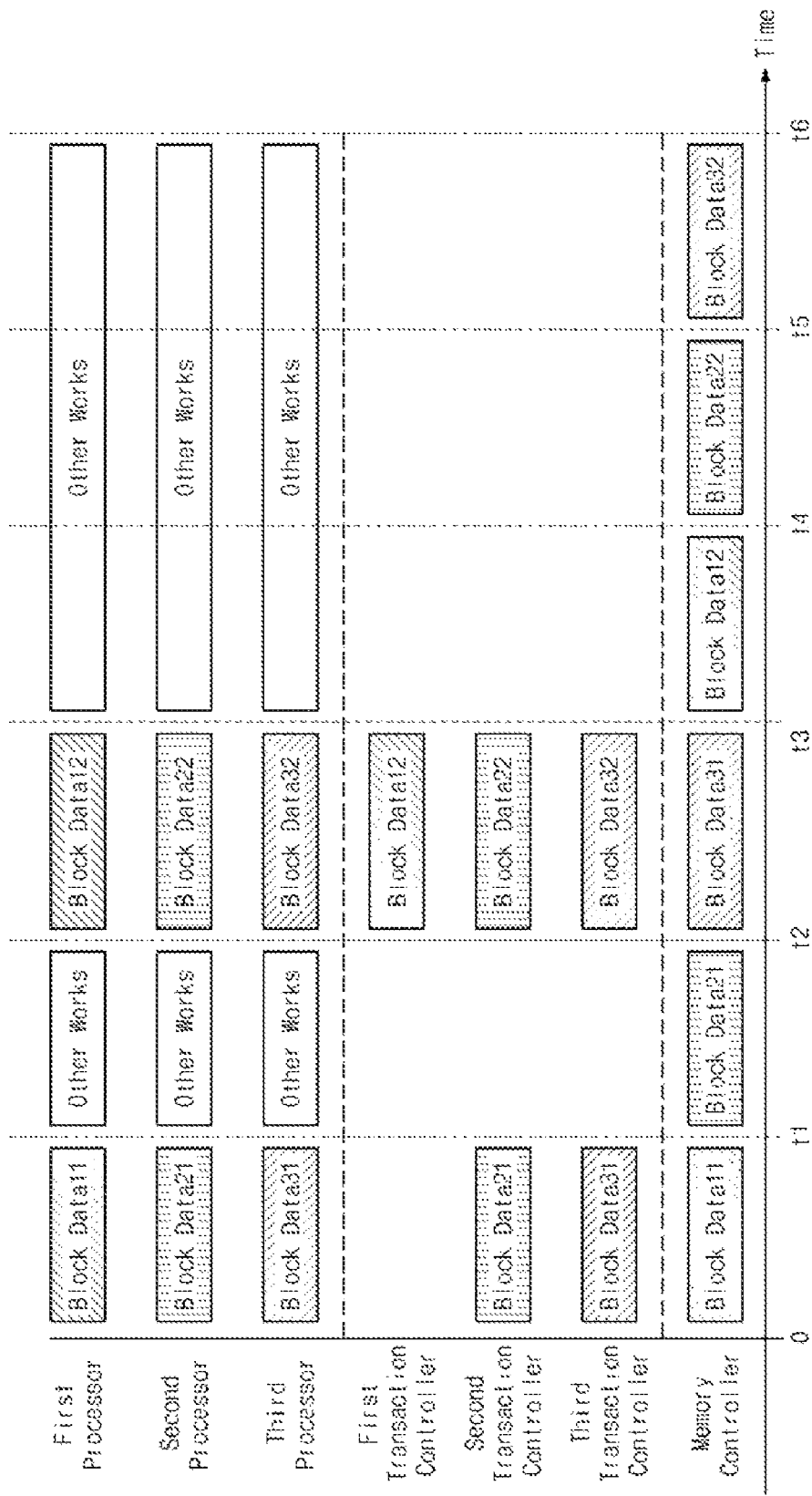
FIG. 4 is a timing diagram of an operation according to another exemplary embodiment of the present invention.

FIG. 4 is a timing diagram of an operation according to another exemplary embodiment of the present invention.

The timing diagram of FIG. 4 is based on the assumption that the first to third processors are connected through the first to third transaction controllers to the memory access switch.

Referring to FIGS. 1 to 4, it is assumed that the first to third processors 11, 16 and 18 simultaneously access the memory device 15.

In a time period from 0 to t1, the first processor 11 stores data Block Data11 in the memory device 15 through the memory access switch 13. At this point, the second processor 16 stores data Block Data21 in the second transaction controller 17, and the third processor 18 stores data Block Data31 in the third transaction controller 19.

In a time period from t1 to t2, the second transaction controller 17 stores data Block Data21 in the memory device 15 through the memory access switch 13. At this point, the first to third processors 11, 16 and 18 perform other operations.

In a time period from t2 to t3, the third transaction controller 19 stores data Block Data31 in the memory device 15 through the memory access switch 13. At this point, the first to third processors 11, 16 and 18 perform other operations, and the first processor 11 stores Block Data12 in the first transaction controller 12. Also, the second processor 16 stores Block Data22 in the second transaction controller 17, and the third processor 18 stores Block Data32 in the third transaction controller 19.

In a time period from t3 to t4, the first transaction controller 12 stores data Block Data 12 in the memory device 15 through the memory access switch 13. At this point, the first to third processors 11, 16 and 18 perform other operations.

In a time period from t4 to t5, the second transaction controller 17 stores data Block Data22 in the memory device 15 through the memory access switch 13. At this point, the first to third processors 11, 16 and 18 perform other operations.

In a time period from t5 to t6, the transaction controller 19 stores data Block Data32 in the memory device 15 through the memory access switch 13. At this point, the first to third processors 11, 16 and 18 perform other operations.

The present invention is applied to the case where multiple processors simultaneously access one of a plurality of memories. Each of the multiple processors includes a transaction controller. Each of the transaction controllers stores data or addresses, transmitted by the multiple processors, so that the multiple processors can perform other operations during the standby time taken to access one of the memories.

Accordingly, the others of the multiple processors can perform other operations while the one of the multiple processors is accessing one of the memories.

Figure 5:
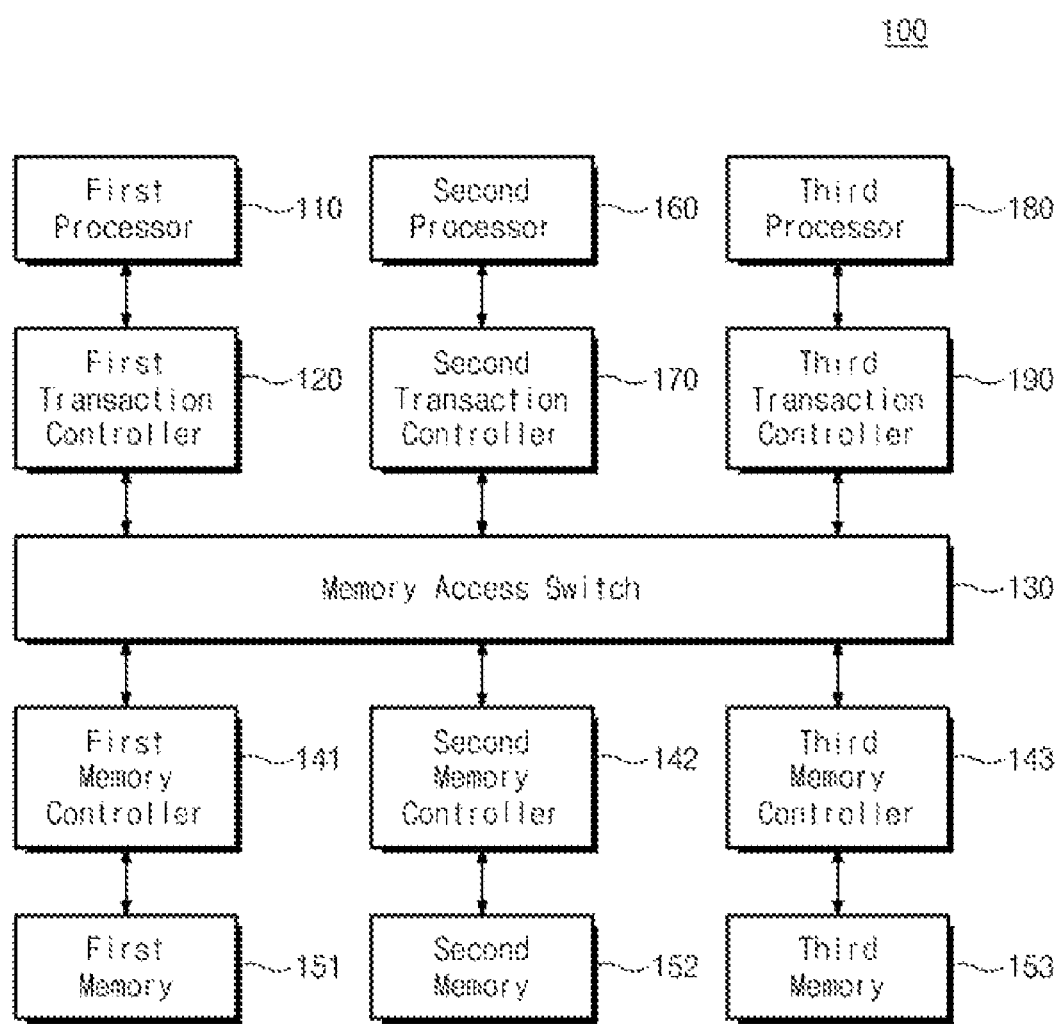
FIG. 5 is a block diagram of a memory access device according to another exemplary embodiment of the present invention.

FIG. 5 is a block diagram of a memory access device according to another exemplary embodiment of the present invention.

The memory access device 100 of FIG. 5 is identical to the memory access device 10 of FIG. 1, except second and third memory devices 152 and 153. Thus, a description of the overlap will be omitted for conciseness.

Referring to FIG. 5, the memory access device 100 includes a first processor 110, a first transaction controller 120, a memory access switch 130, first to third memory controllers 141 to 143, first to third memory devices 151 to 153, a second processor 160, a second transaction controller 170, a third processor 180, and a third transaction controller 190.

The memory access device 100 can be applied when the first to third processors 110, 160 and 180 simultaneously access the first memory device 151, when the first to third processors 110, 160 and 180 simultaneously access the second memory device 152, or when the first to third processors 110, 160 and 180 simultaneously access the third memory device 153

The memory access device 100 is applied when the first to third processors simultaneously access a specific memory. Although it has been described that the memory access device according to the embodiment of the present invention includes three processors and three memory devices, the memory access device may include two or more processors and two or more memory devices.

According to the embodiments of the present invention, each of the processors includes a transaction controller. Each of the transaction controllers stores data or addresses, transmitted by the multiple processors, so that the multiple processors can perform other operations during the standby time taken to access one of the memories.

The memory access device 100 of FIG. 5 is identical to the memory access device 10 of FIG. 1, except the second and third memory controllers 142 and 143 and the second and third memory devices 152 and 153. Thus, the timing diagram of FIG. 3 and the timing diagram of FIG. 4 may be similarly applied to the memory access device 100.

As described above, the present invention is applied to the case where multiple processors simultaneously access one of a plurality of memories. Each of the multiple processors includes a transaction controller. Each of the transaction controllers stores data or addresses, transmitted by the multiple processors, so that the multiple processors can perform other operations during the standby time taken to access one of the memories.

Accordingly, the others of the multiple processors can perform other operations while the one of the multiple processors is accessing one of the memories.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A memory access device comprising:

first and second processors;

first and second transaction controllers coupled respectively to the first and second processors;

a memory access switch coupled to the first and second transaction controllers; and a memory controller coupled to the memory access switch to control a memory device, wherein if the first and second processors simultaneously access the memory device, the second processor is configured to store an address or data in the second transaction controller while the first processor is accessing the memory device, and wherein the memory access switch comprises a bandwidth control scheduler configured to store schedule information about the access of the memory device by the first and second processors, and wherein the bandwidth control scheduler is configured to transmit the stored schedule information to the first and second transaction controllers.

2. The memory access device of claim 1, wherein the stored schedule information is transmitted from an external device by a user.

3. The memory access device of claim 1, wherein the memory access switch comprises a bus matrix.

4. The memory access device of claim 1, wherein the first transaction controller comprises:
a data buffer configured to store data temporarily;
an address table configured to store an address corresponding to the data stored in the data buffer;
an address comparator configured to compare the address stored in the address table and an address requested by the first processor and output a comparison result; and
a stream controller configured to receive the comparison result from the address comparator and connect the first processor and the memory access switch according to the received comparison result.

5. The memory access device of claim 4, wherein if the address requested by the first processor is included in the address table, the stream controller outputs data, corresponding to the address requested by the first processor, from the data buffer to the first processor.

6. The memory access device of claim 4, wherein if the address requested by the first processor is not included in the address table, the stream controller outputs data, corresponding to the address requested by the first processor, from the memory device to the first processor.

7. The memory access device of claim 1, wherein the second transaction controller comprises:
a data buffer configured to store data temporarily;
an address table configured to store an address corresponding to the data stored in the data buffer;
an address comparator configured to compare the address stored in the address table and an address requested by the second processor and output a comparison result; and
a stream controller configured to receive the comparison result from the address comparator and connect the second processor and the memory access switch according to the received comparison result.

8. The memory access device of claim 7, wherein if the address requested by the second processor is included in the address table, the stream controller outputs data, corresponding to the address requested by the second processor, from the data buffer to the second processor.

9. The memory access device of claim 7, wherein if the address requested by the second processor is not included in the address table, the stream controller outputs data, corresponding to the address requested by the second processor, from the memory device to the second processor.

10. A memory access device comprising:
first and second processors;
first and second transaction controllers coupled respectively to the first and second processors;
a memory access switch coupled to the first and second transaction controllers; and
a memory controller coupled to the memory access switch to control a memory device,
wherein if the first and second processors simultaneously access the memory device, the second processor is configured to store an address or data in the second transaction controller while the first processor is accessing the memory device, and
wherein the first transaction controller comprises:
a data buffer configured to store data temporarily;
an address table configured to store an address corresponding to data stored in the data buffer;
an address comparator configured to compare the address stored in the address table and an address requested by the first processor and output a comparison result; and
a stream controller configured to receive the comparison result from the address comparator and connect the first processor and the memory access switch according to the received comparison result.

11. The memory access device of claim 10, wherein if the address requested by the first processor is included in the address table, the stream controller is configured to output data, corresponding to the address requested by the first processor, from the data buffer to the first processor.

12. The memory access device of claim 10, wherein if the address requested by the first processor is not included in the address table, the stream controller is configured to output data, corresponding to the address requested by the first processor, from the memory device to the first processor.

13. A memory access device comprising:
first and second processors;
first and second transaction controllers coupled respectively to the first and second processors;
a memory access switch coupled to the first and second transaction controllers; and
a memory controller coupled to the memory access switch to control a memory device,
wherein if the first and second processors simultaneously access the memory device, the second processor stores an address or data in the second transaction controller while the first processor is accessing the memory device, and
wherein the second transaction controller comprises:
a data buffer configured to store data temporarily;
an address table configured to store an address corresponding to data stored in the data buffer;
an address comparator configured to compare the address stored in the address table and an address requested by the second processor and output a comparison result; and
a stream controller configured to receive the comparison result from the address comparator and connect the second processor and the memory access switch according to the received comparison result.

14. The memory access device of claim 13, wherein if the address requested by the second processor is included in the address table, the stream controller is configured to output data, corresponding to the address requested by the second processor, from the data buffer to the second processor.

15. The memory access device of claim 13, wherein if the address requested by the second processor is not included in the address table, the stream controller is configured to output data, corresponding to the address requested by the second processor, from the memory device to the second processor.

* * * * *